United States Patent [19]

Maier

[11] 3,789,092
[45] Jan. 29, 1974

[54] HALOVINYLENE-1,2-BIS(PHOSPHONIC ESTERS)

[75] Inventor: Ludwig Maier, Kilchberg, Switzerland

[73] Assignee: Monsanto Company, St. Louis, Mo.

[22] Filed: June 9, 1972

[21] Appl. No.: 261,171

[52] U.S. Cl.......... 260/932, 260/502.4 P, 260/956, 260/986
[51] Int. Cl.............................................. G07f 9/40
[58] Field of Search...................... 260/932, 502.4 P

[56] References Cited
UNITED STATES PATENTS

| | | | |
|---|---|---|---|
| 3,156,739 | 11/1964 | Horner et al. | 260/502.4 P X |
| 3,062,792 | 11/1962 | McConnell et al. | 260/932 X |
| 3,171,818 | 3/1965 | Sander | 260/932 X |

OTHER PUBLICATIONS

Kataev et al., Chemical Abstracts, Vol. 69, (1968), 77350w.
Javs, Chemical Abstracts, Vol. 67, (1967), 21964r.

*Primary Examiner*—Lewis Gotts
*Assistant Examiner*—Richard L. Raymond
*Attorney, Agent, or Firm*—L. N. Goodwin et al.

[57] ABSTRACT

Halovinylene-1,2-bis(phosphonic acids) and their corresponding esters of the formula

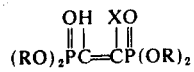

wherein R is hydrogen or a hydrocarbon radical having for example from 1–24 carbon atoms and X is a halogen atom e.g. chlorine or bromine. The halovinylene acids are obtained by hydrolysis or an ethynylene-1,2,-bis(phosphonic acid diester) of the formula

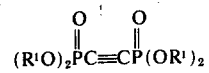

with concentrated aqueous haloacid (HX). The acids are useful as flameproofing agents for combustible organic materials, as inhibitors for metal corrosion, as inhibitors for scale formation and as intermediates in the formation of the corresponding monoesters and diesters. The esters are useful as plasticizers, lubricants, lubricant additives and functional fluids.

4 Claims, No Drawings

HALOVINYLENE-1,2-BIS(PHOSPHONIC ESTERS)

BACKGROUND OF THE INVENTION

1. Field of the Invention

This invention relates to halovinylene-1,2-bis(phosphonic acids) and esters thereof of the formula $$(RO)_2\overset{\overset{O}{\|}}{P}\overset{H}{\underset{|}{C}}=\overset{X}{\underset{|}{C}}\overset{\overset{O}{\|}}{P}(OR)_2$$

wherein R is a hydrocarbon radical having, for example, 1-24 carbon atoms or hydrogen and X is halogen atom. In a further aspect this invention relates to a process for preparing said acids by hydrolysis of an ethynylene -1,2-bis(phosphonic acid diester) of the formula $$(R^1O)_2\overset{\overset{O}{\|}}{P}C\equiv C\overset{\overset{O}{\|}}{P}(OR^1)_2$$

wherein R' is a hydrocarbon radical having, for example, 1-24 carbon atoms.

2. Description of the Prior Art:

It is known that certain phosphonic acid esters can be hydrolyzed with concentrated hydrochloric acid to corresponding phosphonic acids.

SUMMARY OF THE INVENTION

It has been discovered in accordance with the present invention that halovinylene -1,2-bis(phosphonic acids) of the formula $$(RO)_2\overset{\overset{O}{\|}}{P}-\overset{H}{\underset{|}{C}}=\overset{X}{\underset{|}{C}}-\overset{\overset{O}{\|}}{P}(OR)_2$$

are obtained by hydrolysis of an ethynylene -1,2-bis(phosphonic acid diester) of the formula $$(R'O)_2\overset{\overset{O}{\|}}{P}C\equiv C\overset{\overset{O}{\|}}{P}(OR')_2$$

with concentrated aqueous haloacid. It is surprising that the hydrolysis results in the production of halovinylene-1,2-bis(phosphonic acids) instead of the expected ethynylene-1,2bis(phosphonic acid). The process of the present invention thus unexpectedly results in the addition of halide to the acetylenic bond.

DETAILED DESCRIPTION

In carrying out the process of the present invention ethynylene-1,2-bis(phosphonic diester) is heated with concentrated aqueous haloacid until cleavage is complete. The hydrolysis, which occurs simultaneously with addition of halide to the acetylenic bond, occurs as follows:

$$(R^1O)_2\overset{\overset{O}{\|}}{P}C\equiv \overset{\overset{O}{\|}}{P}(OR^1)_2 \xrightarrow[4H_2O]{HX}$$

$$(HO)_2\overset{\overset{OH}{\|}}{P}C=\overset{XO}{\underset{\|}{C}}\overset{}{P}(OH)_2 + 4R^1OH$$

preferably, the released alcohol is continuously removed from the reaction mixture. The thus formed halovinylene-1,2-bis(phosphonic acid) can be separated from the reaction mixture by any suitable procedure, such as, for example, by evaporating water and unreacted haloacid.

In the process of the present invention any suitable haloacid can be employed with such suitable acids including hydroiodic, hydrofluoric, hydrochloric and hydrobromic acid.

Hydrochloric acid and hydrobromic acid are generally preferred.

The ethynylene-1,2-bis(phosphonic acid diesters) employed as starting materials in the process of the present invention are of the formula $$(R^1O)_2\overset{\overset{O}{\|}}{P}C\equiv C\overset{\overset{O}{\|}}{P}(OR^1)_2$$

wherein R' is a hydrocarbon radical having for example, 1-24 carbon atoms such as for example, alkaryl, aryl, higher alkyl, lower alkyl (1-4 carbon atoms) allyl, and cycloalkyl. The lower alkyl esters are the most conveniently used starting compounds in the process of the present invention since the alcohols obtained by the reaction are easily split off and removed from the reaction medium. This class of compounds and their preparation are known to the art. (B. I. Ionin and A.A. Petrov, Zh. Obschch. Khim. 35 (1965), S p 1917).

The halovinylene-1,2-bis(phosphonic acids) of the present invention which have a non-hydrolyzable halogen atom are useful for flameproofing combustible organic materials, as corrosion inhibitors and chelating or complexing agents for sequesting metal ions such as calcium, magnesium, iron, copper etc., as detergent additives in measured amounts for the prevention of precipitation and scale formation in "hard" water, and as stabilizers for peroxide and active chlorine compound bleaching agents. The halovinylene-1,2-bis(phosphonic acids) can be polymerized by standard polymerization methods and can also be esterified to the corresponding diesters using well-known esterification methods such as, for example, heating the acid with an orthoformic acid ester.

The diesters of the present invention are represented by the formula $$(R^2O)_2\overset{\overset{OH}{\|}}{P}C=\overset{XO}{\underset{\|}{C}}P(OR^2)_2$$

wherein X is defined as above and $R^2$ is a hydrocarbon radical for example, alkaryl, aryl, lower alkyl, higher alkyl, alkyl and cycloalky with the $R_2$ group being conveniently derived from an alcohol known to occur in a phosphonate.

Examples of halovinylene-1,2-bis(phosphonic diesters) which can be prepared in accordance with the present invention include fluoro-, bromo-, iodo- and chlorovinylene-1,2-bis(phosphonic dimethylester), chorovinylene-1,2-bis(phosphonic diethylester), chlorovinylene-1,2-bis(phosphonic di-n-propylester), chlorovinylene-1,2-bis(phosphonic di-iso-propylester), chlorovinylene-1,2-bis(phosphonic di-n-butylester), chlorovinylene-1,2-bis(phosphonic di-iso-butylester), chlorovinylene-1,2-bis(phosphonic di-tert-butylester), chlorovinylene-1,2-bis(phosphonic diallylester), chlorovinylene-1,2bis(phosphonic divinylester), chlorovinylene-1,2-bis(phosphonic didodecylester), chlorovinylene-1,2-bis(phosphonic dioleylester), chlorovinylene-1,2-bis(phosphonic distearylester),
chlorovinylene-1,2-bis(phosphonic dieicosylester),
chlorovinylene-1,2-bis(phosphonic dibenzylester),
chlorovinylene-1,2-bis(phosphonic diphenylester),
chlorovinylene-1,2-bis(phosphonic di-tert-butylphenylester),
chlorovinylene-1,2-bis(phosphonic di-$\alpha$-naphthylester,
chlorovinylene-1,2-bis(phosphonic di-$\beta$-naphthylester),
chlorovinylene-1,2-bis(phosphonic dicyclopentylester),
chlorovinylene-1,2-bis(phosphonic dicyclohexadienylester) and the like.

It is understood the the halovinylene-1,2bis(phosphonic diester) may also show a combination of different ester groups.

The halovinylene-1,2-bis(phosphonic acid esters) of the present invention are useful as plasticizers, as lubricants or lubricant additives, and as functional fluids, such as hydraulics and heat transfer agents.

The halovinylene-1,2-bis(phosphonic acids) of the present invention can also be converted to the so-called half-esters of the formula

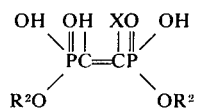

wherein $R^2$ and X are defined as above. These halovinylene-1,2-bis(phosphonic monoesters) are conveniently prepared by heating halovinylene-1,2-bis(phosphonic acid) together with halovinylene-1,2-bis(phosphonic acid diesters) in the presence of a transesterification catalyst preferably using about equimolar quantities of the acid and diester reactants.

The following preparations and examples illustrate specific embodiments of the invention.

PREPARATION

The starting compound ethynylene-1,2-bis(phosphonic diethylester) is prepared in accordance with the cited literature reference as follows:

To an ether solution of 9.4 g(0.1 mol) of ClC≡CCl are added 16.6 g (0.1 mol) of $P(OC_2H_5)_3$ at $-5°$ and the mixture is subsequently refluxed for 1 hour. Upon distillation of the ether 15.9 g (81%) of ClC≡CP(O)(OC$_2$H$_5$)$_2$ remains as a residue. To this residue are added 16.6 g (0.1 mol) of $P(OC_2H_5)_3$, whereby an exothermic reaction occurs and the temperature rises to about 90°C. The mixture is cooled with ice. It is left to stand over night at room temperature and then distilled. 11 point six grams (48%) of

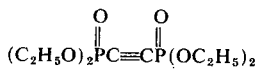

is obtained as a colorless liquid, b.p. 145°C/0.001 mm, $n_D^{20}$ 1.4470. 31p chemical shift + 11 ppm, $^1$H-NMR (in CDCl$_3$): CH$_3$ at 1.36 ppm (J$_{HH}$7 cps, 12 H), CH$_2$ at 4.20 ppm (J$_{HH}$ 7, J$_{POCH}$cps, 8 H) Literature: b.p. 181.5°–185°C/2.5 mm, $n_D^{20}$ 1.4475.

EXAMPLE 1

A mixture consisting of 5 g ethynylene-1,2-bis(phosphonic diethylester) and 50 ml of concentrated HCl is refluxed for 14 hours and then evaporated to dryness thereby to obtain 3.74 g (100 percent) crystals of

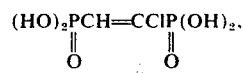

which can be
titrated as a tetrabasic acid. (Equivalent weight found 59.7, calculated 55.6.)

[$^1$H-NMR (in D$_2$O): CH at 7.32 ppm (broad, J$_{PCH}$14 cps) and OH at 6.45 ppm (broad, singulet).]

EXAMPLE 2

A mixture consisting of 3.75 g of chlorovinylene-1,2-bis(phosphonic acid) and 40 ml of HC(OC$_2$H$_5$)$_3$ is refluxed for 3 hours and then fractionally distilled thereby to obtain 2.45 g (43%) of

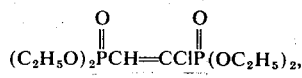

b.p. 130°/0.001 mm. $^1$H-NMR (in CDCl$_3$: CH$_3$ [at 1.33 ppm (J$_{HH}$ 7 cps, 12H), CH$_2$ at 4.17 ppm (J$_{HH}$ 7, (broad, J$_8$ cps, 8 H) and CH at 7.0 ppm (J$_{PH}$12, J$_{PH}$16.5 cps, 1 H).

C$_{10}$H$_{21}$ClO$_6$P$_2$
calc'd % C 35.88 H 6.27 cl 10.59
found % C 35.92 H 6.34 Cl 10.52

The thus obtained chlorovinylene-1,2-bis(phosphonic acid diethylester) is reacted under transesterification conditions with the chlorovinylene-1,2-bis(phosphonic acid) of Example 1 to obtain the corresponding half-ester.

EXAMPLE 3

A mixture consisting of 5 g

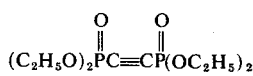

and 50 ml of 40% aqueous solution of HBr is refluxed for 15 hours, evaporated in a rotating evaporator and made completely anhydrous by azeotropic benzene distillation.

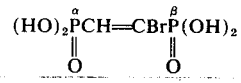

is quantitatively obtained as a colorless oil. $^1$H-NMR (D$_2$O): CH at 7.88 ppm (J$_P$ $_H$12 cps, J$_P$ $_H$17 cps) and OH at 6.3 ppm.

While the invention has been described with reference to particular embodiments thereof, it will be appreciated that modifications and variations are possible without departing from the invention.

I claim:
1. A halovinylene-1,2-bis(phosphonic acid diester) of the formula

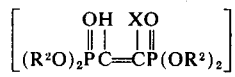

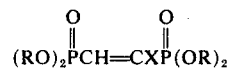

in which X represents a halogen atom and R represents a hydro-carbon radical having 1 to 24 carbon atoms.

2. The compound of claim 1 wherein X represents chlorine or bromine.

3. A halovinylene-1,2-bis(phosphonic acid monoester) of the formula

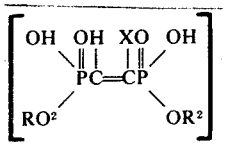

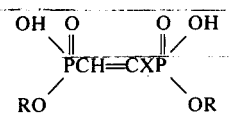

wherein R represents a hydrocarbon radical having 1 to 24 carbon atoms and X represents a halogen atom.

4. The compound of claim 3 wherein X represents chlorine or bromine.

* * * * *

UNITED STATES PATENT OFFICE
CERTIFICATE OF CORRECTION

PO-1050
(5/69)

Patent No. 3,789,092  Dated 1/29/74

Inventor(s) Ludwig Maier

It is certified that error appears in the above-identified patent and that said Letters Patent are hereby corrected as shown below:

Column 4, line 24, "7,broad, $J_8$" should read --7, $J_{POCH}{}^8$--, see specification page 7, line 22.

Column 4, line 51, "$(J_P {}_H{}^{12}$ cps, $J_P {}_H{}^{17}$ cps)" should read --$(J_{P\alpha H}{}^{12}$ cps, $J_{P\beta H}{}^{17}$ cps)-- see specification page 8, line 6.

IN THE CLAIMS

Claim 1, column 4, rewrite claim as follows:

1. A halovinylene-1,2-bis(phosphonic acid diester) of the formula

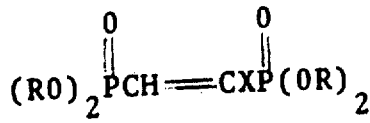

in which X represents a halogen atom and R represents a hydro-carbon radical having 1 to 24 carbon atoms.

Claim 3, column 5 & 6, rewrite claim as follows:

2. A halovinylene-1,2-bis(phosphonic acid monoester) of the formula

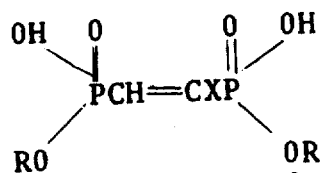

wherein R represents a hydrocarbon radical having 1 to 24 carbon atoms and X represents a halogen atom.

Signed and sealed this 9th day of July 1974.

(SEAL)
Attest:

McCOY M. GIBSON, JR.
Attesting Officer

C. MARSHALL DANN
Commissioner of Patents

PO-1050
(5/69)

UNITED STATES PATENT OFFICE
CERTIFICATE OF CORRECTION

Patent No. 3,789,092  Dated January 29, 1974

Inventor(s) Ludwig Maier

It is certified that error appears in the above-identified patent and that said Letters Patent are hereby corrected as shown below:

Please insert the Statement of Priority which was omitted by the U. S. Patent Office, as follows, in the Heading:

--Claims priority, application Switzerland,

June 30, 1971, 9591/71--

Signed and sealed this 31st day of December 1974.

(SEAL)
Attest:

McCOY M. GIBSON JR.
Attesting Officer

C. MARSHALL DANN
Commissioner of Patents